United States Patent [19]

Tsunefuji

[11] Patent Number: 5,473,401
[45] Date of Patent: Dec. 5, 1995

[54] CAMERA HAVING A LOCKING MECHANISM FOR PREVENTING ACCIDENTAL OPENING OF A BACK COVER

[75] Inventor: Katsuhiko Tsunefuji, Kanagawa, Japan

[73] Assignee: Olympus Optical Co., Ltd., Tokyo, Japan

[21] Appl. No.: 212,947

[22] Filed: Mar. 15, 1994

[30] Foreign Application Priority Data

Mar. 19, 1993 [JP] Japan .................................. 5-060628
Mar. 19, 1993 [JP] Japan .................................. 5-060629

[51] Int. Cl.⁶ .................................................. G03B 17/02
[52] U.S. Cl. ......................................................... 354/288
[58] Field of Search ................................. 354/288, 289.1

[56] References Cited

U.S. PATENT DOCUMENTS

| 4,834,306 | 5/1989 | Robertson et al. | 354/275 X |
| 5,212,511 | 5/1993 | Burnham et al. | 354/288 X |
| 5,262,814 | 11/1993 | Nishio et al. | 354/288 |

FOREIGN PATENT DOCUMENTS

| 52-108120 | 10/1977 | Japan . |
| 66932 | 4/1981 | Japan . |
| 59-228234 | 12/1984 | Japan . |
| 61-42626 | 3/1986 | Japan . |
| 2-302743 | 12/1990 | Japan . |
| 2-293742 | 12/1990 | Japan . |
| 3-261930 | 11/1991 | Japan . |
| 4-1626 | 1/1992 | Japan . |
| 4-151136 | 5/1992 | Japan . |

Primary Examiner—Howard B. Blankenship
Attorney, Agent, or Firm—Louis Weinstein

[57] ABSTRACT

The present camera uses a film cartridge which is loaded by the drop-in process, the camera comprising a back door with a retaining hole for covering the opening which exposes the area around the aperture for cleaning, and a lock lever comprising a retaining mechanism rotatably supported at the lower portion of a cartridge chamber. With the film cartridge loaded, the lock lever moves clockwise, such that its front end or retaining portion is fitted into the retaining hole provided in the back door. For this reason, while the cartridge is loaded, the user can not accidently open the back door, even if he attempts to open it, preventing the film from being sensitized as a result of operational errors.

31 Claims, 11 Drawing Sheets

CAMERA HAVING A LOCKING MECHANISM FOR PREVENTING ACCIDENTAL OPENING OF A BACK COVER

BACKGROUND OF THE INVENTION

1. Field of the Invention

The present invention relates to a camera, and, more particularly, to a cover means structure for covering an opening at the back side thereof and an electrical connection structure in a camera, in which a film cartridge based on a film piece supplying process is loadable in the camera by a drop-in process, that is, by dropping the cartridge into the camera.

RELATED ART STATEMENT

In a camera into which is loaded a film cartridge having a conventional film pull-out leader section, the cartridge is loaded, as shown in FIG. 11 illustrating a perspective view of a conventional single-lens reflex camera. For this reason, there is provided a back cover 2 which can be opened and closed by moving cover 2 respectively to the right and to the left with respect to the camera. In other words, the back cover 2 has its right side hinged, and is opened and closed in the direction toward which the film rail surfaces 6 and 7 extend, or put it in another way, in the F direction which is the same direction the film moves. In order to load a film cartridge 1 having the above-described conventional film pull-out leader section 1a, it has been necessary to insert the cartridge 1 in the G direction into a cartridge chamber 4 as well as to insert the leader section 1a of the film into a spool 5. Thus, as shown in FIG. 11, the camera has had a structure in which the back cover 2 opens widely such that it aligns with the sides of the camera in the moving direction of the film, thereby allowing mounting of a jig, used for assembly adjustments, or mounting thereof around an aperture, as well as allowing simple cleaning around the aperture.

In recent years, there have been proposed various film cartridges, based on the film piece supplying system, which is capable of being loaded into the camera by being dropped therein, and not having a film pull-out leader section, in other words, a film cartridge having all or almost all of the film accommodated, when it is not loaded in the camera. For example, a film cartridge is disclosed in U.S. Pat. No. 4,834,306 (May 30, 1989), which has accommodated the film wound around a winding shaft, while being shielded from light, and an opening allowing the film to pass into and out of the cartridge. In this type of cartridge, initially, the front end of the film is accommodated therein, without any of the film extending out of the cartridge. With the camera loaded with the cartridge, rotating the winding shaft and loosening the film pushes out the film tip from the cartridge.

Similar film cartridges are proposed in U.S. patent application Ser. No. 320440 (filed Mar. 8, 1989) and Japanese Patent Laid-Open No. 2-293742.

A camera which utilizes a film cartridge capable of being loaded by being dropped therein is disclosed, for example, in Japanese Patent Laid-Open No. 3-261930. In the disclosed camera, a cartridge inserting section is provided on the side surface of the camera for loading the film cartridge therein.

In Japanese Patent Laid-Open No. 4-1626 and Japanese Patent Laid-Open No. 4-151136, there are disclosed cameras in which an opening portion is provided on the back or left upper side of the camera for loading the film cartridge therein.

In these conventional cameras, however, only the structure of the inserting section of the film cartridge, and the inserting and removing operations were considered.

In the camera which utilizes a drop-in loading type cartridge, however, a back cover, is, essentially, not needed to load the film. However, it is necessary to properly clean the area around the aperture where the film passes, as well as to adjust the focusing of the photographic optical system. Therefore, it is necessary to provide an opening at the back side of the aperture and a cover means for the opening which is capable of being opened and closed.

In addition, in the above-described camera which utilizes the drop-in loading type cartridge, the opening provided on the back side of the aperture is used for mounting the above-described jig used for adjustments in assembly such as focusing adjustments and photometric adjustments onto film rail surfaces, and is necessary to remove chips accumulated on the film due to long use and dust which has externally entered around the aperture, for example, such as on film rail surfaces and a pressure plate. The cover means which covers this opening is neither opened nor closed during film loading and removal, unlike the conventional back cover 2 in FIG. 11 described above.

There may be a camera which has a cartridge inserting cover for the opening used to insert the above-described drop-in type film cartridge, and an aperture cover corresponding to the above-described cover means, in addition to the cartridge inserting cover. In addition, in this camera, the above-described aperture cover may be opened to mount the jig used for adjustments in assembly and to perform cleaning around the aperture.

In this camera, however, when the film cartridge is inserted in the cartridge chamber, the aperture cover may be unintentionally opened, thereby sensitizing the film.

On the other hand, in order to accommodate electrical circuits such as a data copying circuit in the back cover 2 such as that shown in FIG. 11 described above, electrical connection is accomplished around the hinged portion at the right side of the camera, as described below. In addition, when the back cover 2 has such a structure, mounting of the jig used for adjustments in assembly and cleaning of the area around the aperture can be easily performed by opening the back cover 2. In Japanese Utility Model Laid-Open No. 56-66932, there is disclosed a camera which has an electrical connection structure around the above-described hinged section, which electrically connects electrical circuits provided in the back cover and those at the camera body side.

In this camera, the back cover has electrical circuits of the data copying device mounted therein, and has a hinged portion which allows the cover to open widely to the left and to the right in the supplying direction of the film. In addition, the electrical circuits at the camera body side are connected by a flexible printed board (hereinafter referred to as FPC) having electrical circuits provided in the back cover arranged in the hinged portion.

In Japanese Patent Laid-Open No. 61-42626, there is disclosed a data copying device of a camera which uses a conductive torsion coil spring provided in the hinged portion to connect electrical circuits for copying data, mounted in the back cover, the cover being, in the same way, capable of being opened widely to the left and to the right.

Further, in Japanese Patent Laid-Open No. 52-108120, there is disclosed a camera which has a direct contact provided in the back cover, which is capable in the same way of being opened widely to the left and to the right. The electrical circuits in the camera body and those in the back cover are connected by means of the above-described direct contacts.

In Japanese Patent Laid-Open No. 59-228234, there is disclosed a camera which has electrical circuits such as data copying circuits accommodated in the back cover, which is capable in the same way of being opened widely to the left and to the right, connected to those of the camera body by the use of a direct contact placed at the lower portion of the camera.

In Japanese Patent Laid-Open No. 2-302743, there is disclosed a camera which has electrical circuits such as data copying circuits accommodated in the back cover, which is capable in the same way of being opened widely to the left and to the right, connected to those of the camera body by the use of a direct contact placed at the upper portion of the camera.

In any of the cameras, which utilizes a film cartridge having a conventional pull-out leader section, including those which utilize the above-described connecting means as the FPC, a direct contact, and the like, the back cover is supported by a supporting shaft disposed orthogonally to the film feeding direction. In addition, the cover is so structured as to be capable of being opened widely to the left and to the right.

The above-described cover means only needed to have a relatively small area and an opening and closing angle of about 90°.

However, in the cameras which utilize the film cartridge loadable by being dropped into the camera, the use of an FPC (disclosed in the above-mentioned Japanese Utility Model No. 56-66932), or a conductive coil spring (disclosed in Japan Patent Laid-Open No. 61-42626) as means for electrical connection to electrical circuits at the cover means side, the electrical connecting section cannot be placed at the left and right sides of the cover means (film supplying direction), because the cover means, itself, of the camera having the above-described drop-in type film cartridge does not extend up to the left and right sides of the camera body. Accordingly, space must be separately provided for the electrical connecting section.

In the cameras which use electrical connecting means as means to electrically connect the cover means of the camera having the drop-in type film cartridge (disclosed in the aforementioned Japanese Patent Laid-Open No. 52-108120), those which use as electrical connecting means a direct contact disposed at the lower part of the opening (disclosed in Japanese Patent Laid-Open No. 59-228234), and those which use as electrical connecting means a direct contact disposed at the upper part of the opening (disclosed in Japanese Patent Laid-Open No. 2-302743), the direction of the rotating shaft of the cover means and the direction of arrangement of the contacts are orthogonal to each other, so that it is difficult to make uniform the applied pressure acting on the contacts, thereby reducing the reliability of the contact structure.

In the structure which has a direct contact at the upper part of the cover means, there are optical parts such as a pentaprism and a finder screen at the upper part of the camera, so that it has been difficult to obtain optical paths for these parts.

OBJECTS AND SUMMARY OF THE INVENTION

In a camera capable of loading a film cartridge based on the film piece supplying process, a first object of the present invention is to provide a camera in which a cover means, which covers an opening used to mount a jig for assembly adjustments and for cleaning the area around an aperture, is not unintentionally opened during cartridge loading.

In a camera utilizing a film cartridge capable of being loaded by a drop-in method, a second object of the present invention is to provide a camera having a cover means for cleaning, which accommodates electrical circuits at the opening of the back part of the aperture, in which connecting means of the electrical circuits does not become an obstacle to mounting optical members of the camera and in which size reduction can be easily performed.

In a first camera embodiment of the present invention capable of loading a film cartridge based on the film piece supplying process, there are provided a first cover means which opens to allow loading of the film cartridge; a second cover means which opens to allow exposure of at least a portion of a film supplying path in the camera body; and an indicating means for indicating that the above-described film cartridge is loaded in the above-described camera body, when it is loaded.

In a second camera embodiment of the present invention which loads the film after the film cartridge has been inserted in the camera by the drop-in method, there are provided an opening which at least exposes an aperture and a film rail surface mounted above and below the aperture almost parallel to the direction of the loading of the above-described film; a cover means which accommodates electrical circuits, and is displaced around a predetermined portion located below the film rail surfaces, which surfaces are disposed at a bottom portion of the camera body, so that it moves to cover and expose the opening; and connecting means which connects, at the vicinity of the above-described predetermined portion, the electrical circuits of the cover means and those at the camera body side.

Other features and advantages of the present invention will become apparent with reference to the following description.

DETAILED DESCRIPTION OF THE PREFERRED EMBODIMENT

The embodiments of the present invention will be described below with reference to the drawings.

Figure 1:
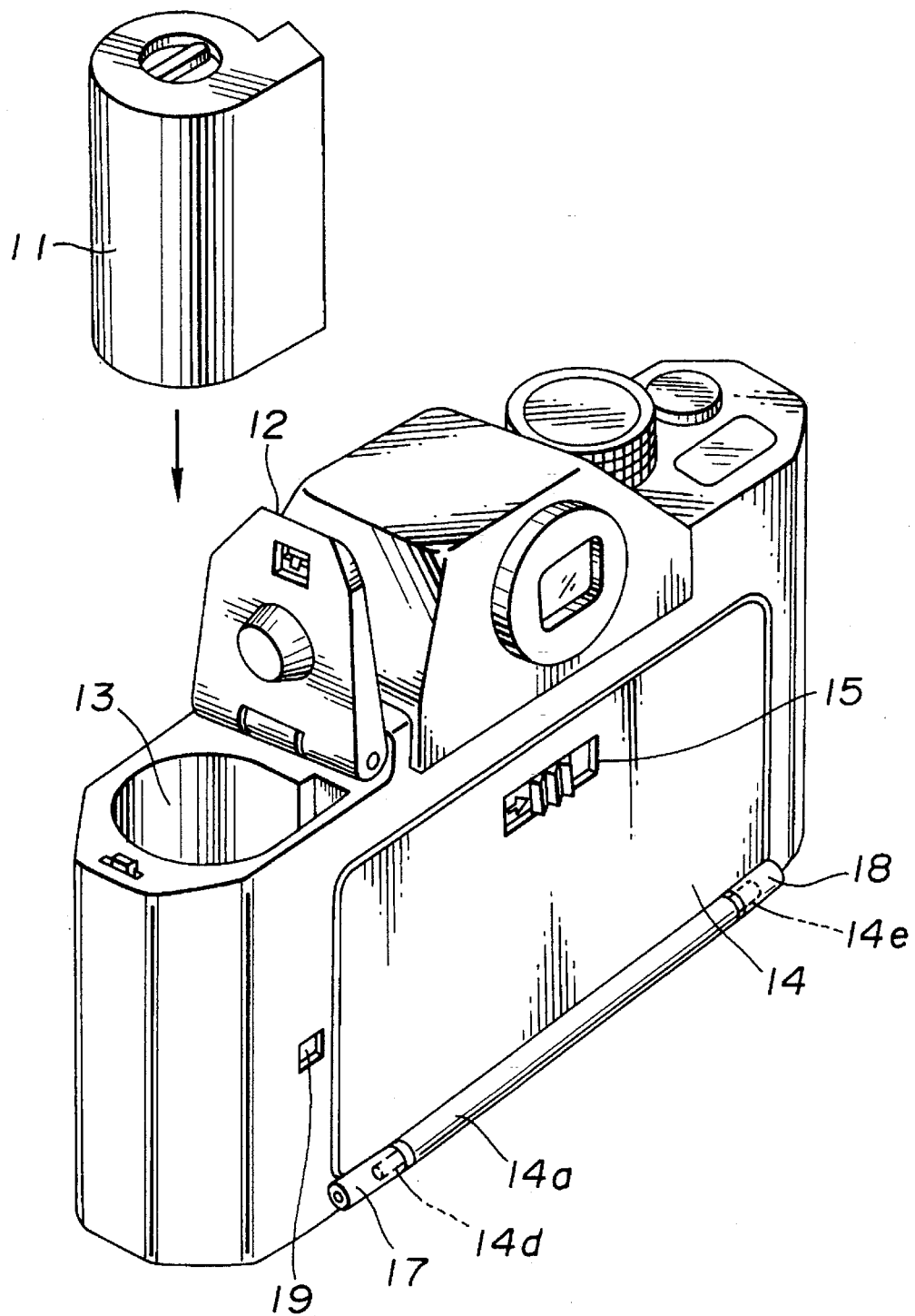
FIG. 1 is a perspective view showing an appearance of a camera in accordance with a first embodiment of the present invention.

FIG. 1 is a perspective view of a first embodiment of the present invention illustrating an appearance of a single-lens reflex camera. As shown in the Figure, film cartridge 11 used in the present camera is of the same type as that disclosed in U.S. Pat. No. 4,834,306.

In the camera of the present embodiment, the above-described cartridge 11 is loaded into the camera by opening a cartridge chamber cover 12 which serves as a first cover means located at the left shoulder portion of the camera, and then inserting the cartridge by dropping it into the cartridge chamber 13. When the cartridge chamber cover 12 is closed, the film is automatically supplied, so that the film is wound up to the first frame, thereby completing the preparation for photography.

The camera of the present embodiment, as shown in FIG. 1, has a back door 14 which serves as a second cover means useful for covering an opening 16a of a camera body 16 described below (see the perspective view of FIG. 2). The back door 14 is supported in a freely rotatable manner, by support pins 14d and 14e, fixed to a hinged portion 14a, which serves as a rotating means for the back cover, and which are fitted into hinged portions 17 and 18 disposed below the opening 16a located at the camera body 16 side. The back door 14 may be left opened by allowing a slide tab 15 to slide to the right, thereby releasing the locking mechanism portion.

Figure 2:
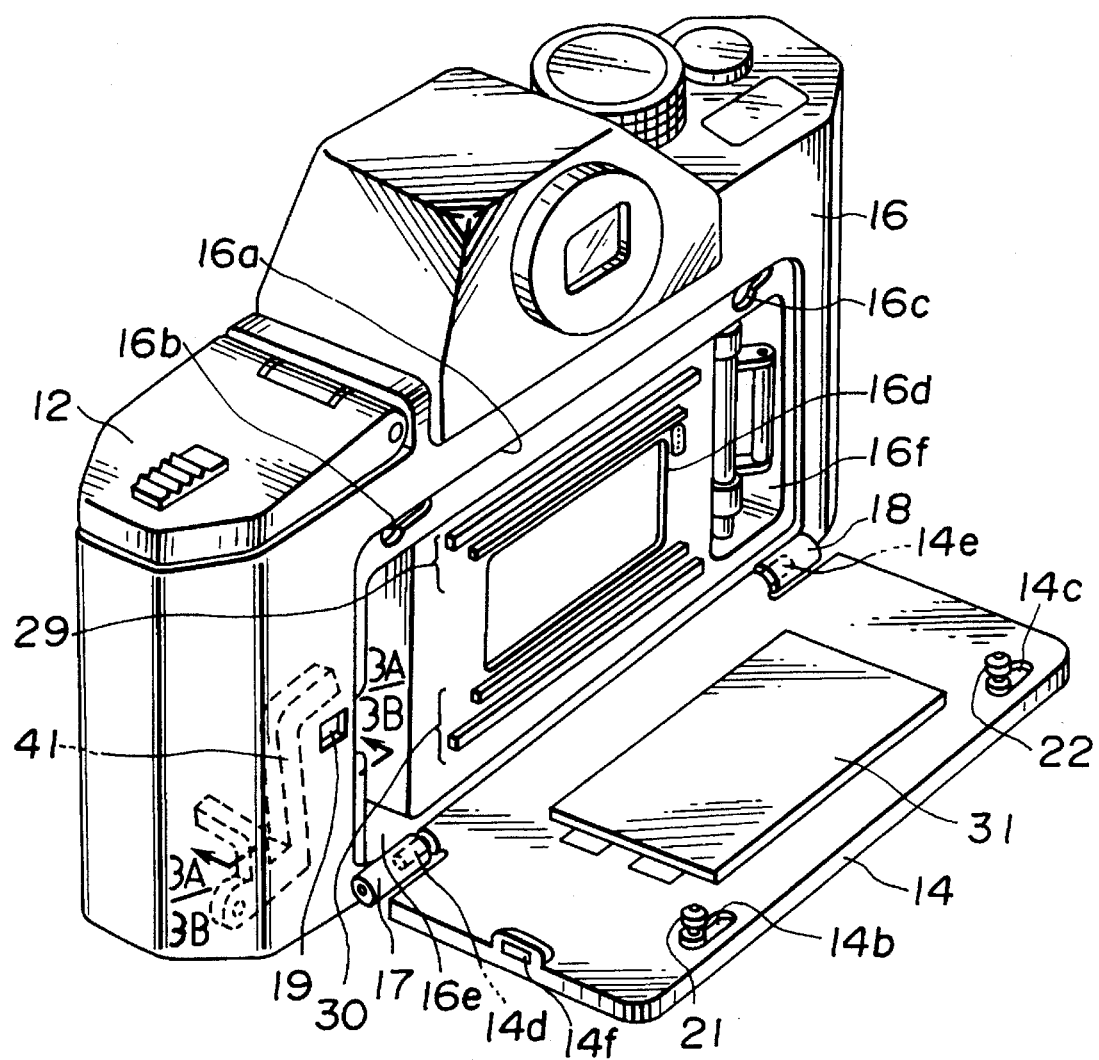
FIG. 2 is a perspective view showing the camera of FIG. 1 with an opened back door.

As in the perspective view of FIG. 2 illustrating the camera with its back door opened, the above-described opening 16a is only large enough to expose an aperture portion 16d, upper and lower film rail surfaces 29 and 30, a film cartridge chamber entrance 16e, a film winding chamber 16f, and the like, and does not extend over the entire back side of the camera body. In addition, the opening 16a allows mounting of the jig used for adjustments in assembly to the aperture, and cleaning of the area around the aperture. As shown in FIG. 2, a film holding pressure plate 31 is provided on the inner side of the back cover 14.

The present camera incorporates a lock mechanism to prevent operational errors of sensitizing the film and the like, resulting from unintentional opening of the back door 14 during photography. This lock mechanism serves as retaining means for preventing operational errors, in which the back door 14 cannot be opened, while the film cartridge 11 is inserted in the cartridge chamber 13. The lock mechanism which serves as retaining means will be described later in detail.

Display window 19 shown in FIG. 1 is an indicating section which indicates whether or not the film cartridge 11 is in the cartridge chamber 13. When the cartridge is inserted, it displays in red. The display window will be described in detail below, along with the lock mechanism serving as the retaining means described above.

Next, the locking mechanism of the back door 14 will be described. The locking mechanism is different from the lock mechanism for preventing operational errors.

As shown in FIG. 2, there are provided at the back door 14 pins 21 and 22 which may be inserted into lock holes 16b, 16c located on the body side. The pins 21 and 22 are such that they can move on long grooves 14b and 14c by sliding a slide tab 15. When the slide tab 15 is allowed to slide, while the back door 14 is closed, the above-described pins 21 and 22 move to the right into the notches of the lock holes 16b and 16c located at the body 16 side, and maintains the back cover 14 in a closed state. Sliding the slide tab 15 to move the above-described pins 21 and 22 to the left along the long grooves 14b and 14c releases the back door from its closed state, so that, as shown in FIG. 2, the back door 14 is in a rotatable state around the supporting pins 14d and 14e at the hinged portion 14a in the direction the cover is opened.

There will be described the structure of above-described lock mechanism which is used for preventing operational errors and serves as retaining means, and the display section serving as a indicating means.

A lock hole portion 14f is provided in the side surface of the cartridge chamber 13 side of the back door for the operational error preventing mechanism, as shown in FIG. 2. When a retaining portion 41b at the front end of a lock lever 41 described below (see cross sectional views in FIGS. 3A and 3B) is inserted into the retaining hole 14f, the back door 14 is caused to be in a retained state, incapable of being opened.

Figure 3A:
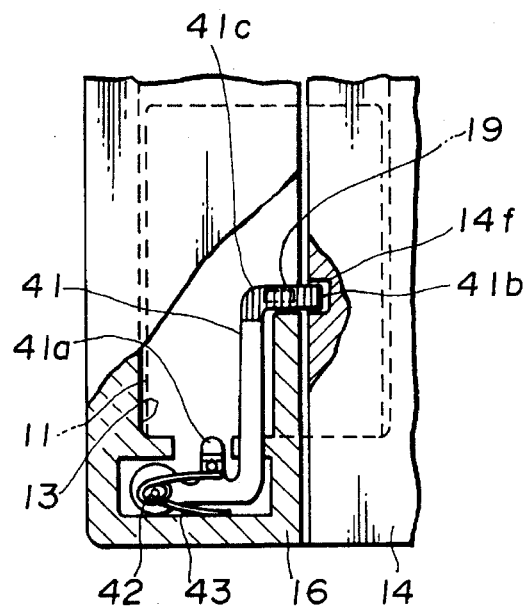
FIG. 3A is a cross sectional view of the camera of FIG. 1 showing a retaining mechanism at the back door, with the film cartridge loaded and looking in the direction of arrows 3A/3B-3A/3B of FIG. 2.
Figure 3B:
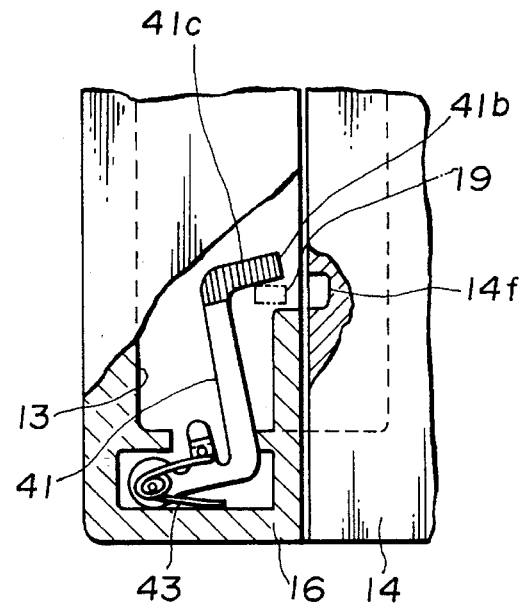
FIG. 3B is a cross sectional view of the camera of FIG. 1 whose film cartridge is not loaded at the retaining mechanism at the back cover and looking in the direction of arrows 3A/3B-3A/3B of FIG. 2.

FIGS. 3A and 3B are cross sectional views (cross section taken on line 3A/3B—3A/3B in FIG. 2) showing the operating state of the above-described lock mechanism portion for preventing operational errors which is provided on the side surface of the cartridge chamber 13 of the present camera. FIG. 3A is a cross sectional view in which the film cartridge 11 is inserted in the cartridge chamber 13, while FIG. 3B is a cross sectional view in which the film cartridge 11 is not inserted. Here, the back door 14 is closed.

As shown in FIGS. 3A and 3B, like a crank, the lock lever 41 at the side surface of the cartridge chamber 13 has one end supported in a rotatable manner on the supporting shaft 42 located at the lower portion of the cartridge chamber 13. A torsion spring 43 is stretched between the lock lever 41 and the camera body 16, and, as shown in FIG. 3A, the lock lever 41 is energized in a counterclockwise direction.

The lock lever 41 has a projecting portion 41a on a portion thereof, the projecting portion extending up to virtually the central position line and towards the inner portion of the cartridge chamber 13 in FIG. 3A. A front end retaining portion 41b capable of being inserted into a retaining hole 14f provided in the back door 14 is provided on the other end of the lock lever 41.

A red-colored portion 41c serving as the indicating section is provided around and close to a predetermined area of the above-described retaining portion 41b. The red-colored portion 41c is externally observed via the indicating window 19, when the retaining portion 41b of the lock lever 41 is inserted and retained in the retaining hole 14f in the back door 14. When the retaining portion 41b is removed from the retaining hole 14f, the red-colored portion 41c cannot be observed.

In the camera of the present embodiment having the above-described arrangement, the slide tab 15 is slid to open the back door 14, as shown in FIG. 2, when mounting the adjusting jig for assembly of the camera in the aperture, or when cleaning the area around the aperture. The adjusting jig may be mounted in the aperture 16b to make adjustments in assembly of the camera. A blower or a brush may be used to clean the surface of the film pressure plate 31 and the film rails 29 and 30 in the vicinity of the aperture 16b, the film cartridge chamber 13 (see FIG. 1), and film winding chamber, thereby removing chips, sand, dust, and the like from the opening 16a.

In the camera of the present embodiment, when the film cartridge 11 is inserted into the cartridge chamber 13 for taking photographs, as shown in FIG. 3A, the projecting portion 41a is pushed downward, so that the front end retaining portion 41b of the lock lever 41 enters the retaining hole 14f provided in the back door 14, thereby preventing the back door 14 from being opened. Therefore, when the film cartridge is inserted in the cartridge chamber 13 for photography, the back door 14 will not be opened, even if the user slides the slide tab 15 on the back door 14 by mistake, thus eliminating sensitization of the film. By the red-colored front end portion 41c, the indicating window 19 indicates in red, so that it can be easily known that the film cartridge 11 is inserted.

On the other hand, when the film cartridge 11 is not inserted in the cartridge chamber 13, as shown in FIG. 3B, the lock lever 41 is rotated counterclockwise by an energizing force imparted by the torsion spring 43, causing the front end retaining portion 41b to be removed from the retaining hole 14f provided in the back door 14. The back door 14 is released from its retained state, and at the same time, the red-colored portion 41c moves away from the indicating window 19, so that it can be easily known that the film cartridge is not inserted. When the film cartridge is not inserted in the cartridge chamber, the back door 14 can be opened by sliding the slide tab 15 provided on the back door 14.

In the camera of the present embodiment described above, the back door 14 which serves as cover means capable of being freely opened and closed may be provided, so that mounting of the adjusting jig and cleaning may be easily carried out. At the same time, when the film cartridge is loaded, a lock mechanism serving as a retaining means prevents the back door 14 from being opened, thereby eliminating the problem of accidental opening of the back door when photographs are being taken. By means of the display section, it can be easily known whether or not the film cartridge is loaded.

Figure 4:
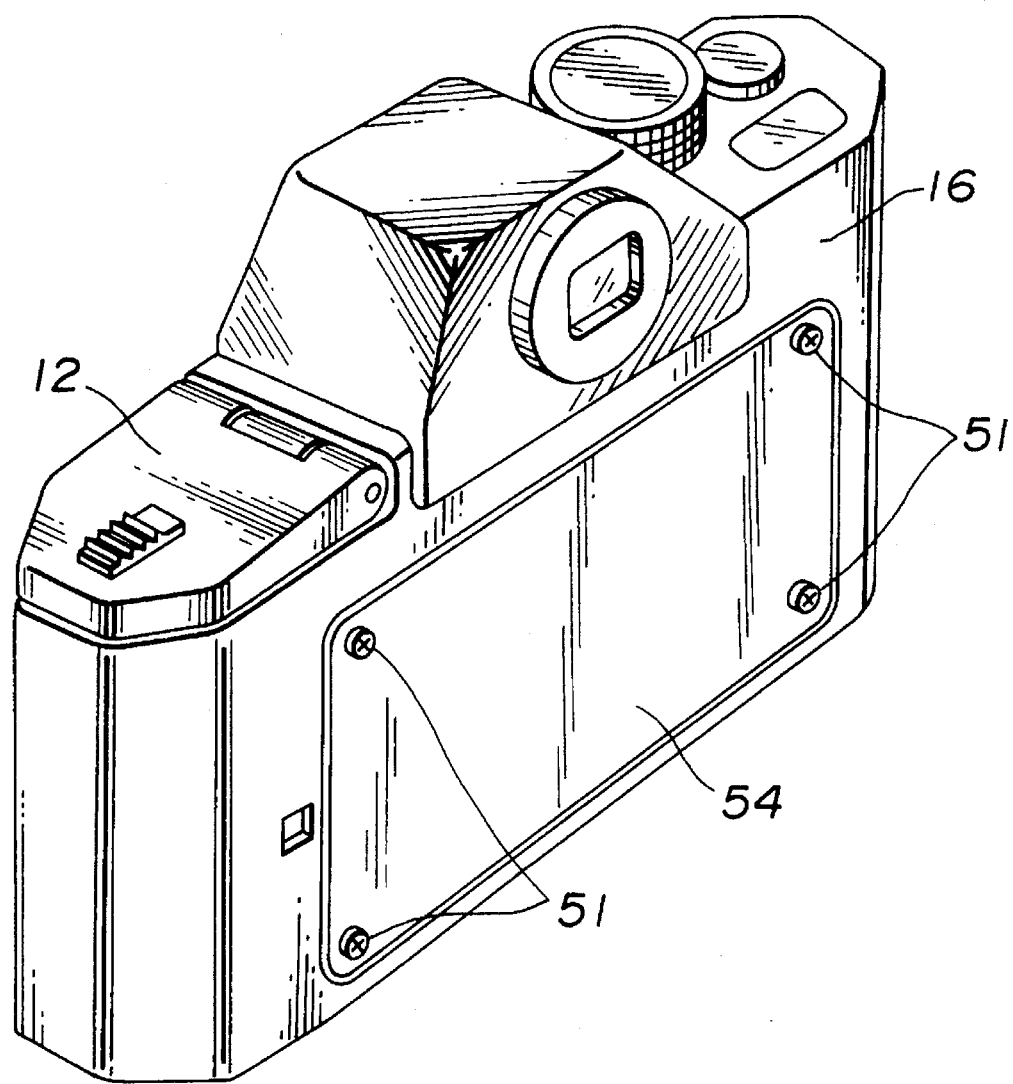
FIG. 4 is a perspective view showing a modification of the back door of the camera in accordance with the embodiment of FIG. 1.

In the present embodiment, the back door 14, is held by the hinged portion 14a in a freely rotatable manner, so that it can be opened and closed by sliding the slide tab 15. However, the back door 14 is not opened and closed very often. Accordingly, a modification of the back door of the camera of the present embodiment, as illustrated in FIG. 4 shown in perspective, may be so constructed as having a back door 54 secured with screws 51, without being hinged by a hinged portion. In this modification, the screws 51 may be removed to open the door 14, only when it is necessary to open the back door 54. Except for the mounting structure of the back door 54 to the camera body, the camera of the above-described embodiment has the same structure, in which, for example, while the film cartridge 11 is loaded, the back door 54 cannot be opened, even when the screws 51 are removed because of the above-described lock mechanism 41b-14f. This embodiment does not require a mechanism for mounting the back door 54 to the body, thus being less costly.

Figure 5:
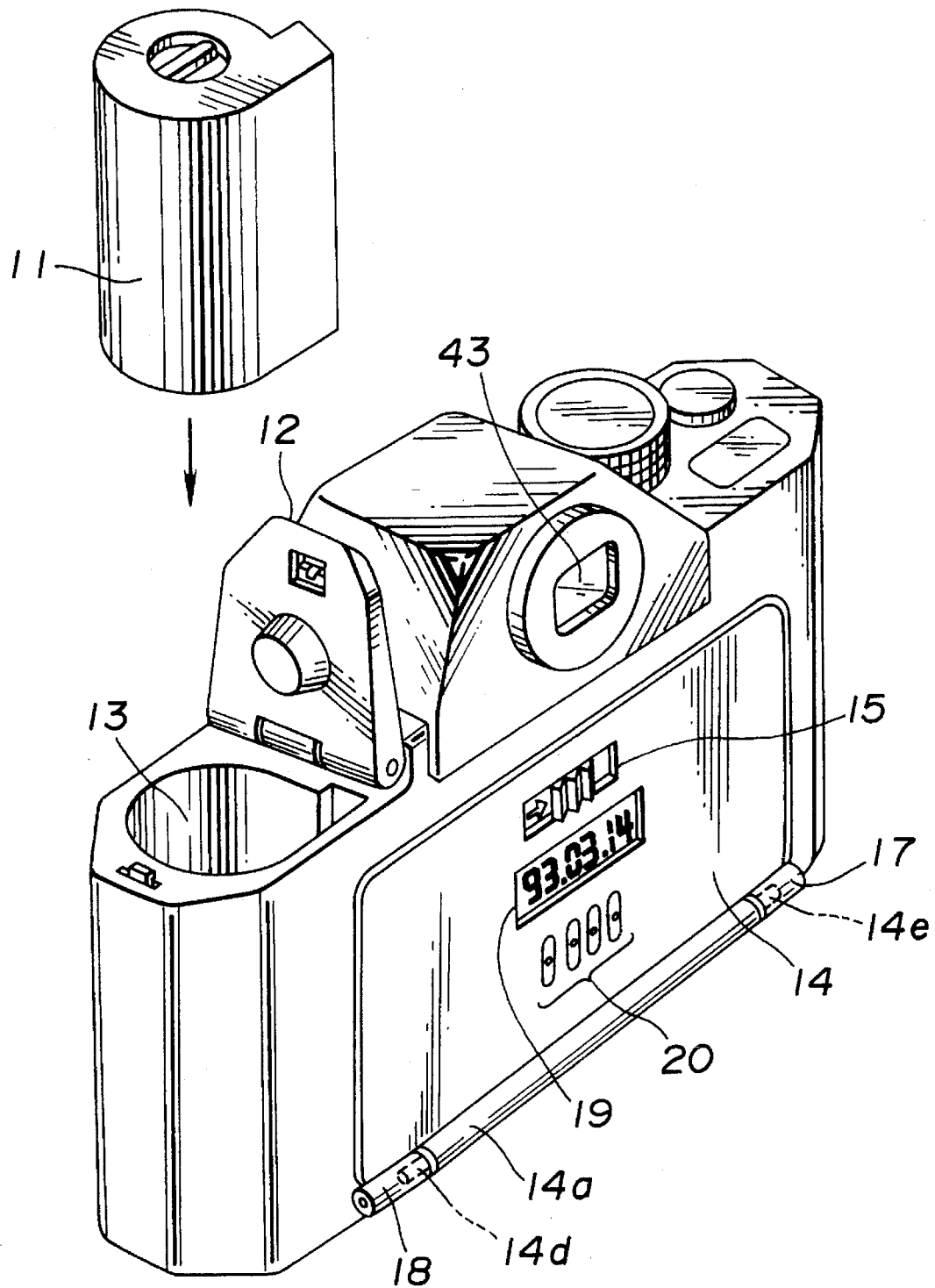
FIG. 5 is a perspective view showing an appearance of a camera in accordance with a second embodiment of the present invention.

Next, a camera in accordance with a second embodiment of the present invention will be described below with reference to FIG. 5 shown in perspective and the like.

The aforementioned FIG. 5 is a perspective view of an appearance of a single-lens reflex camera of the second embodiment. As illustrated in the present Figure, film cartridge 11 applied in the present camera, like the camera of the above-described first embodiment, is of the same type as the film cartridge disclosed in the aforementioned U.S. patent application Ser. No. 173,396 (Mar. 25, 1988). Accordingly, as in the first embodiment, the method used to load the cartridge 11 consists in opening a cartridge chamber cover 12 which serves as first cover means, and then dropping the cartridge into the cartridge chamber 13 for insertion. The present camera has a structure which is partly the same as that of the camera of the first embodiment, so that identical component members of the structure are given identical reference numerals as those of the first embodiment.

Figure 6:
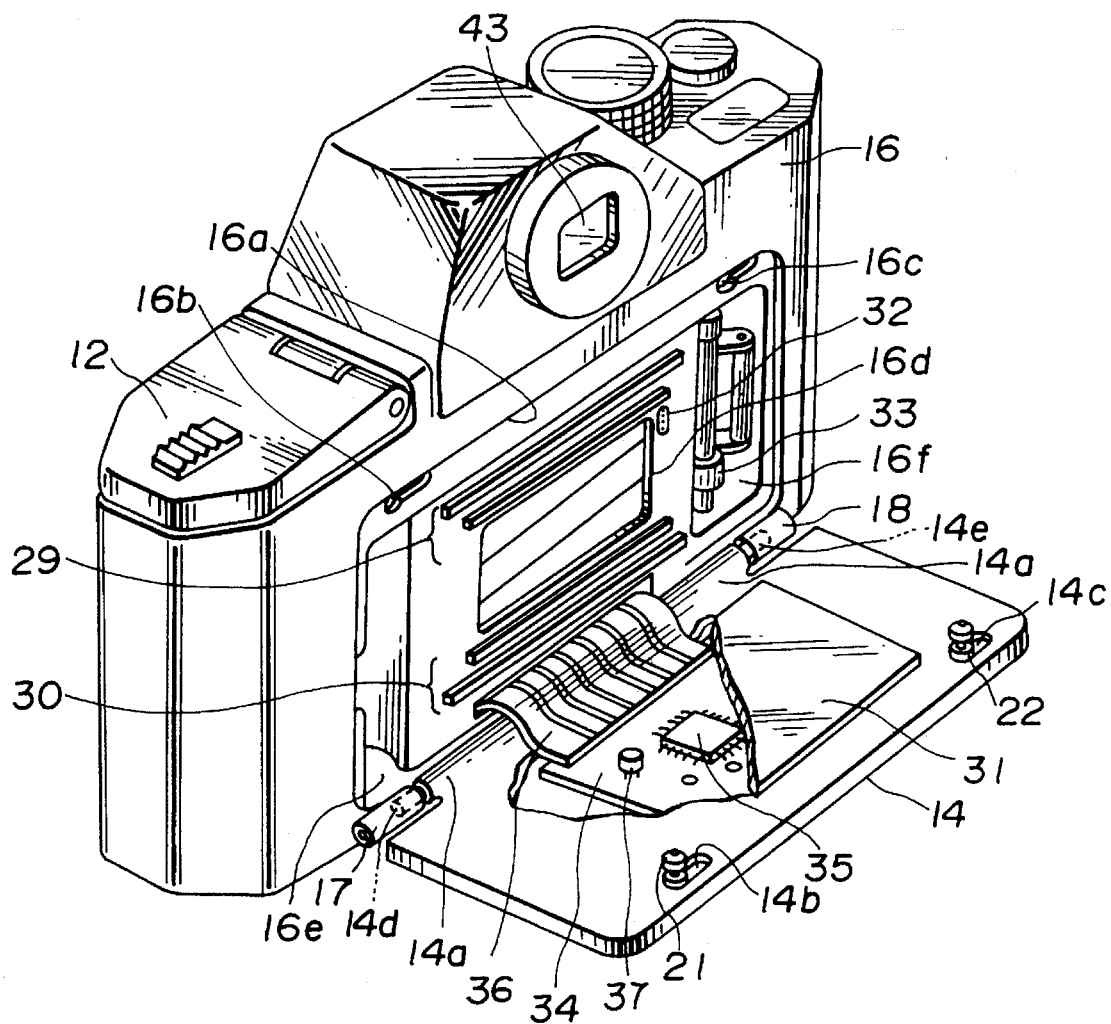
FIG. 6 is a perspective view showing the camera of the aforementioned FIG. 5 with an opened back door.

In the present camera, as shown in FIG. 6 illustrating a perspective view of an opened back door, there is provided an opening 16a large enough to expose aperture 16d, upper and lower film rail surfaces 29 and 30, film cartridge chamber entrance 16e, film winding chamber 16f, and the like, with these portions exposed to view when the back door is opened. The opening 16a is provided at the back side of the camera where a second cover means which can be opened and closed is placed. As shown in FIG. 6, via the opening 16a, the jig used for adjustments in assembly is mounted in the aperture, and the area around the aperture is cleaned, while the back door is opened.

The back door 14 is secured in a freely rotatable manner, by supporting pins 14d and 14e, each of which are rotating means fixed to their respective hinged portions 14a, 14a, the supporting pins being inserted into hinged portions 17 and 18 at the camera body side. The hinged portions 17 and 18, and the supporting pins 14d and 14e are placed below the lower film rails 30, and extend in the direction of the rails; that is, they are placed parallel to the direction of film supply. In addition, a pressure plate 31 is provided on the inner portion of the back door 14 for holding the film.

The back door 14 internally accommodates a data copying electrical circuit board which serves as an electrical circuit member (see FIG. 6 shown in perspective). On the external side of the back door 14, there are provided a liquid-crystal display section 19 and a group 20 of operating switches. When necessary, the group of switches 20 may be used to set, when taking photographs, the copying data including the date of photography.

On the external side of the back door 14, there is provided a slide tab 15, which when allowed to slide in the direction of the arrow (see FIG. 5), opens a locking mechanism section of the back door. When the back door is turned by means of the hinged portion 14a, the opening 16a at the back side of the camera body is exposed, as shown in FIG. 6, enabling cleaning to be carried out. The door can be turned and opened to about 90°.

The above-described back door locking mechanism section is of the same type as the mechanism for the camera of the first embodiment, but is different from the lock mechanism used for preventing malfunctioning.

At the side portions of the aperture 16d of the camera body 16, there is provided an LED dot light emitting section 32 which copies data when film is being transferred by means of the dot matrix method. In this light-emitting section 32, eight LED elements are vertically arranged. How much the film has moved is detected by a roller 33 provided below the light-emitting elements. The roller synchronizes with the speed at which the film moves, so that the above-described LED elements blink, which allows alphabet data, numerical data, and the like, to be copied on the picture-taking screen.

On the electrical circuit board 34 accommodated in the back door 14, there is provided component parts of the electrical circuits to process the above-described copied data. In other words, a microcomputer 35, another electrical component 37, and the like are mounted on the board 34.

Figure 7:
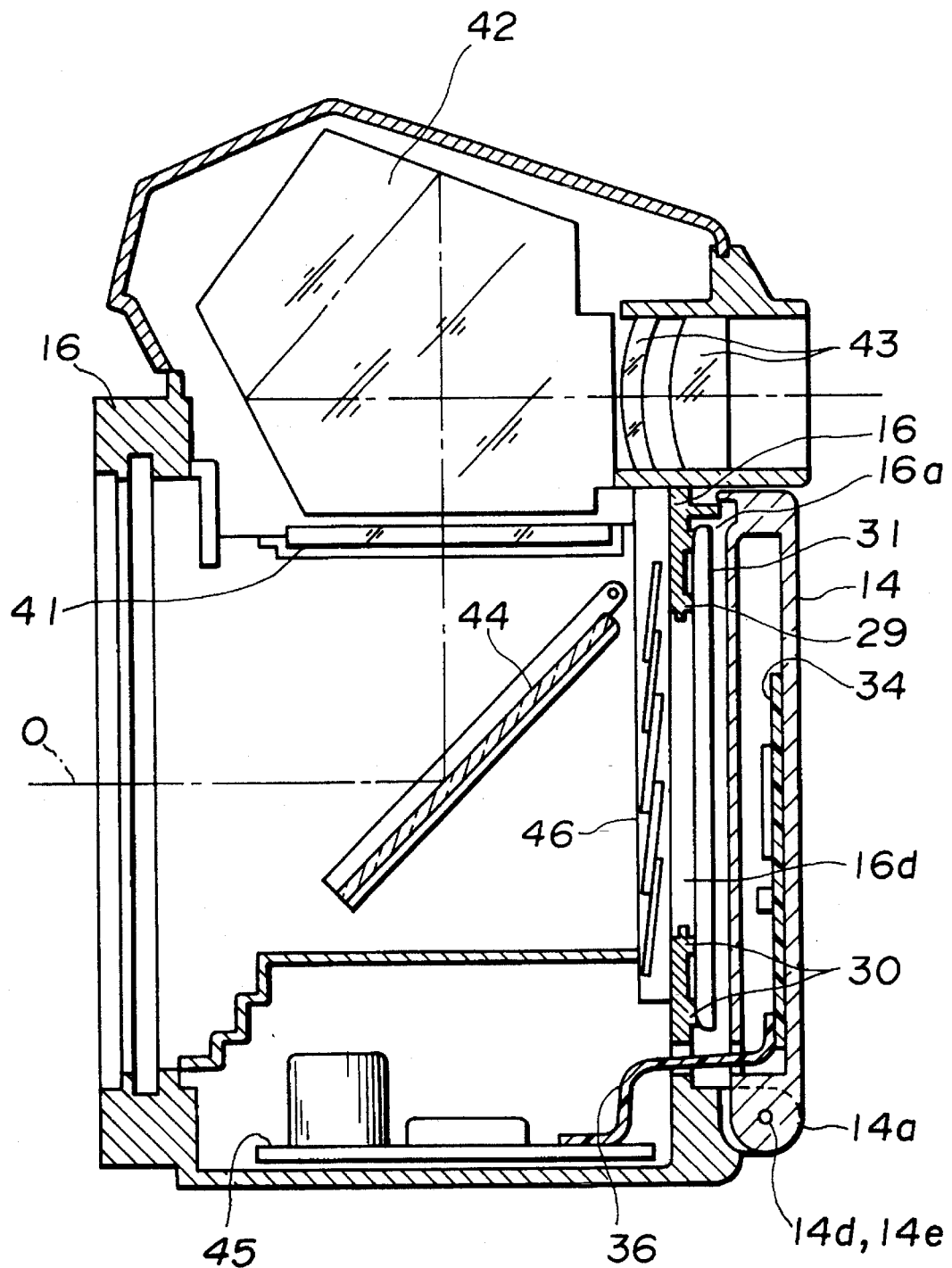
FIG. 7 is a longitudinal sectional view of the camera of FIG. 5 with a closed back door.

The data-copying electrical circuits mounted on the electrical circuit board 34 on the back door 14 side must be, as illustrated in the longitudinal sectional view of FIG. 7, electrically connected to electrical circuits 45 which include drive circuits of an LED dot light-emitting section 32 which serves as a member containing electrical circuits on the camera body 16 side. For this reason, in the present embodiment, an FPC 36 (see FIG. 6 shown in perspective) which is a flexible board and serves as a connecting means is used to connect the circuit board 34 to the electrical circuits 45 on the camera body side. However, the problem is where the FPC 36 should be placed.

The above-described FIG. 7 is a longitudinal sectional view of the camera body 16 and the back door 14 section, in which optical parts including a finder screen 41, a pentaprism 42, and an eyepiece 43 are provided. Behind a reflecting mirror 44, there is a shutter unit 46 which covers the aperture 16*d* of the picture-taking screen section. Accordingly, there is not much space at the upper portion of the camera body 16 to place the FPC36.

Accordingly, in the camera of the present embodiment, as illustrated in the above-described FIGS. 6 and 7, the FPC is placed further below the lower film rail surfaces 30, such that it passes near the hinged portion 14*a* which supports the back door 14.

In the camera of the present embodiment having such a structure, the opening 16*a* is provided at the back side of the camera, as in the camera of the first embodiment, to clean the area around the aperture 16*d* and for making adjustments during or after assembly. The opening 16*a* is covered by the back door 14 which can be rotated.

Cleaning around the aperture, and focusing and photometric adjustments are carried out in the same way as in the camera of the first embodiment of the invention, by sliding the slide tab 15 and opening the back door, as shown in the perspective view of FIG. 6.

In addition, in the camera of the present embodiment, the back door 14 is opened by rotating it around the hinged portion 14*a* placed parallel to the direction toward which the rail surfaces extend, which is located below the rail surfaces 30 of the back door 14. The FPC 36 for electrical connection, which is placed near the hinged portion 14*a*, does not act as an obstacle to the rotating of the door, nor does it reduce the amount of space available for mounting finder optical systems and the like at the upper portion of the camera. Besides, the electrical circuitry 45 on the camera body side is placed below the camera body 16, so that it can be readily connected to the FPC placed below the electrical circuitry. Further, the size of the-camera is greatly reduced, with increased reliability of the connecting section.

A single-lens reflex camera of a third embodiment of the present invention will be described with reference to the perspective view of FIG. 8, longitudinal sectional view of FIG. 9, and the like. In the camera of the present embodiment, film cartridge 11, which is the same type of cartridge as that used for the camera of the second embodiment described above, is used, in which the film is loaded based on the drop-in method.

Figure 8:
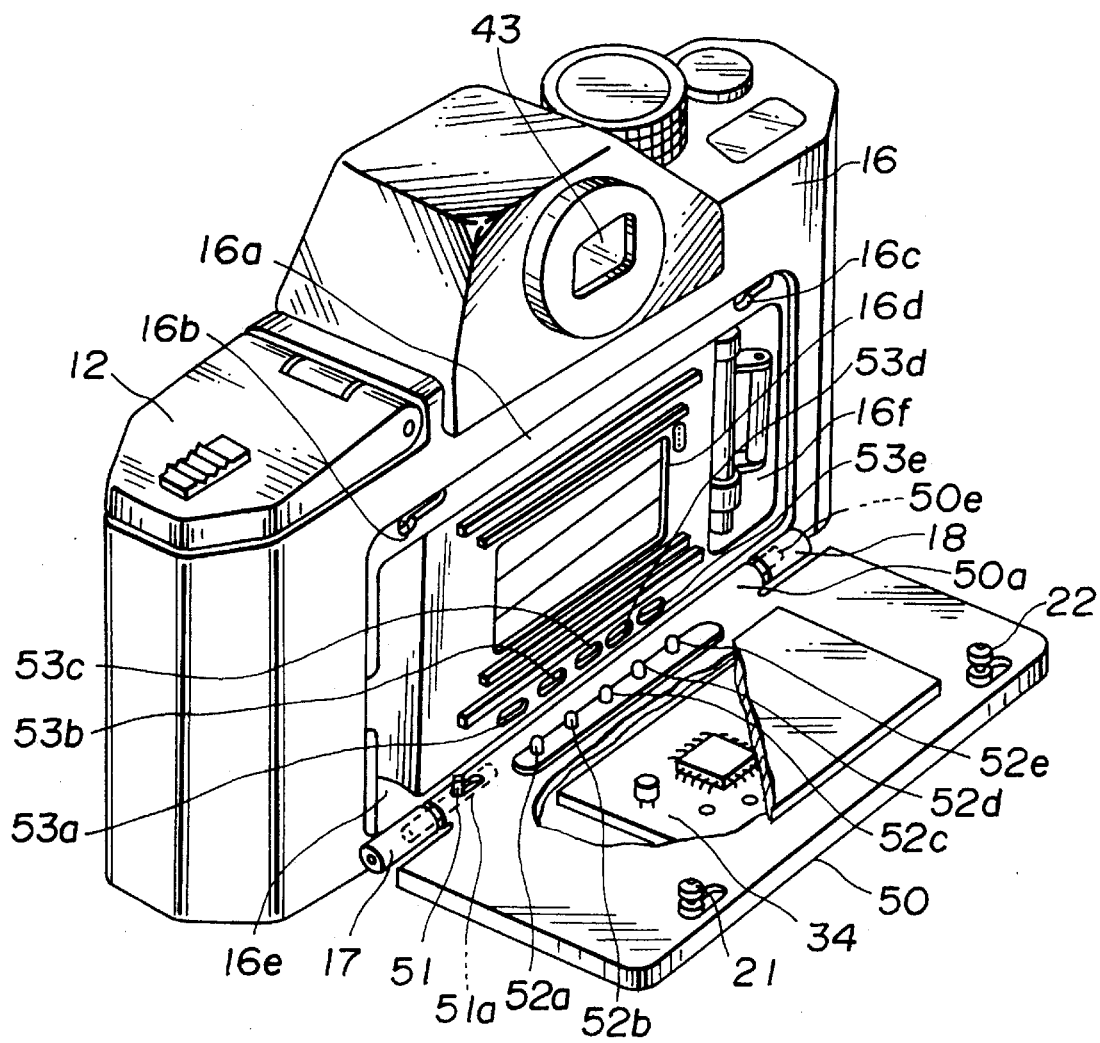
FIG. 8 is a perspective view of a camera in accordance with a third embodiment of the present invention with an opened back door.

In the camera of the present embodiment, electrical circuit board 34 at the cleaning back door 50 side and electrical circuit board 45 at the camera body 16 side (see FIG. 9 described above) are electrically connected by connecting pins 52*a*, 53*a*, and the like that are direct contacts serving as connecting means, as shown in the perspective view of FIG. 8, which illustrates an opened back door. The camera differs from the camera of the second embodiment in that the back door 50 may be freely removed from the camera body 16. The other structural members are the same as those of the camera of the second embodiment. Accordingly, identical members will be described using identical reference numerals.

As shown in FIG. 8, in the internal portion of the back side of the camera body 16, there are provided an opening 16*a*, an aperture 16*d*, and the like, as for the camera of the second embodiment. Hinged portion 50*a* of the back door 50 is placed below frame rail surfaces 29 and 30 and parallel to the direction toward which they extend. At one end thereof, there is provided a supporting pin 51*a* that can slide axially and that serves as rotating means. The supporting pin 51*a* is fitted into the hinged portion 17 of the camera body 16. On the other end thereof, there is provided a supporting pin 50*e* serving as rotating means, which is fitted in the hinged portion 18 of the camera body 16 in a rotatable manner. The above-described supporting pin 51*a* has an operating pin 51 whose front end is projected such that it can be externally operated in the axial direction, while the camera door is opened.

The back door 50 is removed from the camera body by moving the above-described operating pin 51 to the right and pulling it out of the hinged portion 18 of the camera body 16. Then, moving the back door 50 to the left allows it to be removed from the camera body 16. In this case, as will be described below, in the present embodiment, electrical connections are carried out by means of direct contacts, thus allowing the back body 50 to be completely removed from the body 16.

In the present embodiment, the same mechanism as that used in the second embodiment is used for the locking mechanism section of the back door 54. The back door is closed sliding a slide tab.

Next, there will be described an arrangement of the direct contacts used to carry out the aforementioned electrical connections in the camera of the present embodiment.

Figure 9:
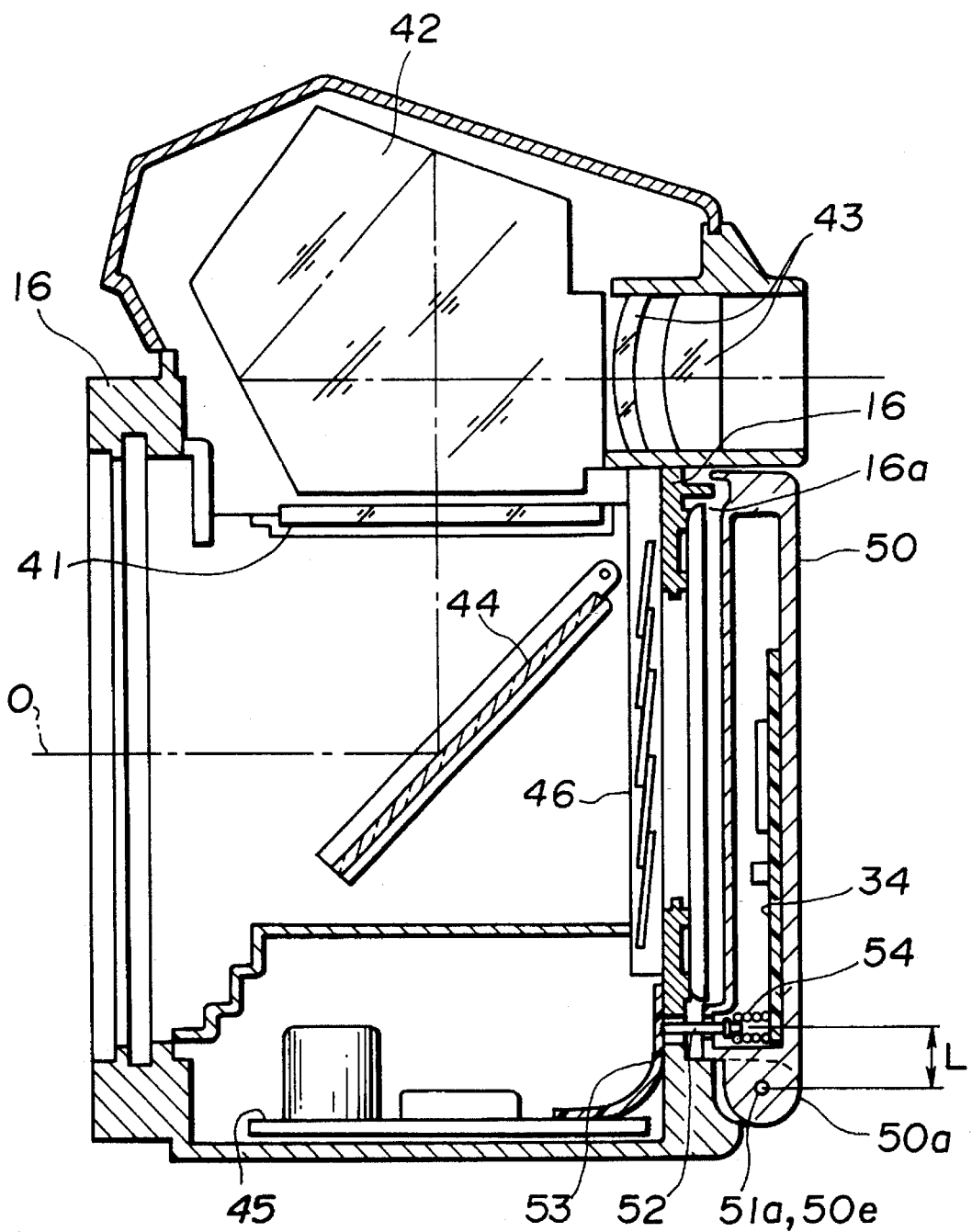
FIG. 9 is a longitudinal sectional view of the camera of the aforementioned FIG. 8 with a closed back door.

Even in the present embodiment, the back door 50 internally accommodates a circuit board 34 having data copying electrical circuits, as shown in the longitudinal sectional view of FIG. 9 illustrating a closed back door 50. The camera body 16 has an electrical circuit board 45. Below the back door 50, there are provided connecting pins 52*a* through 52*e* used as contacts electrically connected to the circuit board 34 on the back door side by means of a coil spring 54 in a freely removable manner, the coil spring exerting contact pressure to the contact portion. The connecting pins 52*a* through 52*e* are arranged in an array which is parallel to the axial direction of the connecting pins 51*a* and 50*e* provided in the hinged portion 50*a*. The distance, L, between the axial center of the supporting pins 51*a* and 50*e*, and the connecting pins 52*a* through 52*e*, is made as small as possible.

On the other hand, on FPC 53 connected to the electrical circuit 45 on the camera body 16 side, there are provided connecting patterns 53a to 53e, in correspondence with the positions of the above-described pins 52a through 52e. When the back door 50 is closed, as shown in FIG. 9, each of the connecting pins 52a through 52e come into contact with their respective patterns 53a through 53e (see FIG. 8), so that each of the electrical circuits 34 and 45 are connected.

As shown in FIG. 9, even for the camera of the present embodiment a finder screen 41, a pentaprism 42, an eyepiece 43, and other optical parts are provided at the upper portion of the camera body 16, as for the camera of the second embodiment, so that almost no space is available for an electrical connecting portion. Therefore, it is very effective space-wise to place the connecting pins for carrying out electrical connection and the like at the lower portion of the body 16, as described above.

In the camera of the present embodiment having such an arrangement, the cleaning is carried out in the same way as it is carried out for the camera of the second embodiment by sliding the slide tab and releasing the retaining section of the lock pins 21 and 22 and the like to open the back door 54. At this time, if it is necessary to remove the back door 50, the operating pin 51 is slid to the right and the supporting pin 51a is removed from the body side to remove the back door 50. Since the electrical connecting section has contacts, as described above, the back door 50 can be completely separated from the body 16.

The back door 54 is put back onto the body 16 by inserting one of the supporting pins 50e of the back door 50 into the hinged portion 18 on the body side. Then, the operating pin 51 is slid to the right to insert the supporting pin 51a into the hinged portion 17 at the body side, so that the back door 50 is put back onto the body 16.

To close the back door 54, the back door 50 is closed, with the above-described retaining section set in a retained state. With the retaining section in a retained state, the connecting pins 52a through 52e come into contact with the connecting section patterns 53a through 53e, so that the electrical circuits 34 and 45 are in a connected state.

As described above, the camera of the present invention uses direct contacts as the electrical circuit connecting section, allowing separation of the back door 50 from the camera body 16, so that electrical circuits and other parts may be replaced. Since the connecting pins and the hinged portion are located below the opening, there is enough space available for placing the optical members. Since, as shown in FIGS. 8 and 9, the connecting pins are lined up near the supporting pins for rotation provided in the hinged portion, each of the connecting pins and each of the shafts are equally spaced apart and are close together. Accordingly, stable electrical connections can be achieved, without floating of the back door 50 caused by the energizing force of the coil spring 54.

The back door of the camera of the present embodiment is a relatively narrow door, so that, as in the back cover of the above-described conventional example, it is difficult to set a rotating shaft, which is positioned orthogonal to the film rails, from the center of the camera. For this reason, the structure of the camera is such as having a back door rotatably secured by supporting pins provided at the lower portion of the camera body, in the direction that the film rail surfaces extend, thereby permitting cleaning to be performed easily.

In the cameras of the second and third embodiments, data copying circuits have been used as an example of electrical circuits accommodated in the back door. However, it is obvious that the embodiments are not restricted thereto. Other circuits may also be used, such as automatic focusing circuits, motor control circuits, microcomputers, memory circuits, and the like necessary to control the camera.

Figure 10:
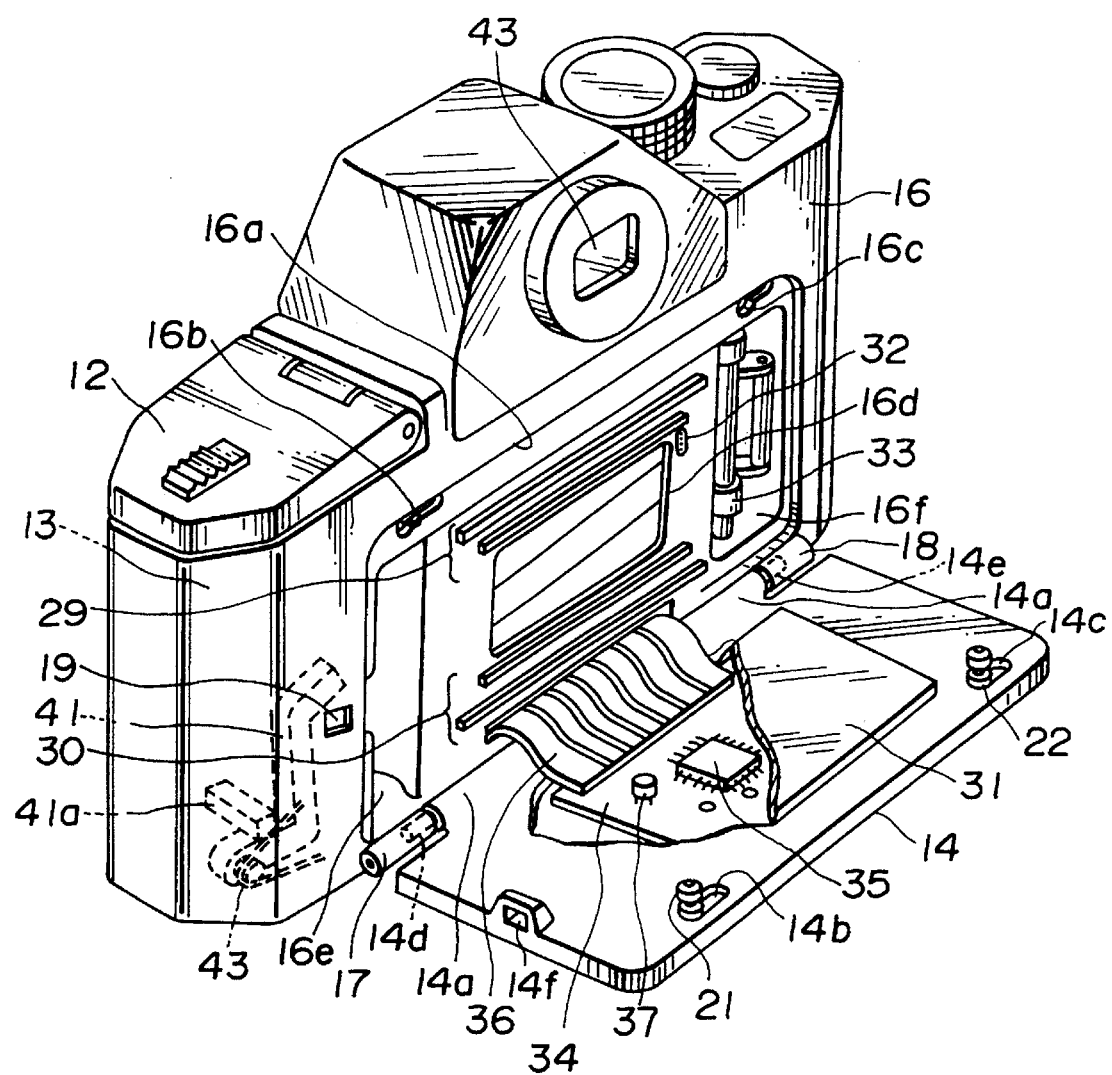
FIG. 10 is a perspective view of a camera in accordance with a fourth embodiment of the present invention with an opened back door.
Figure 11:
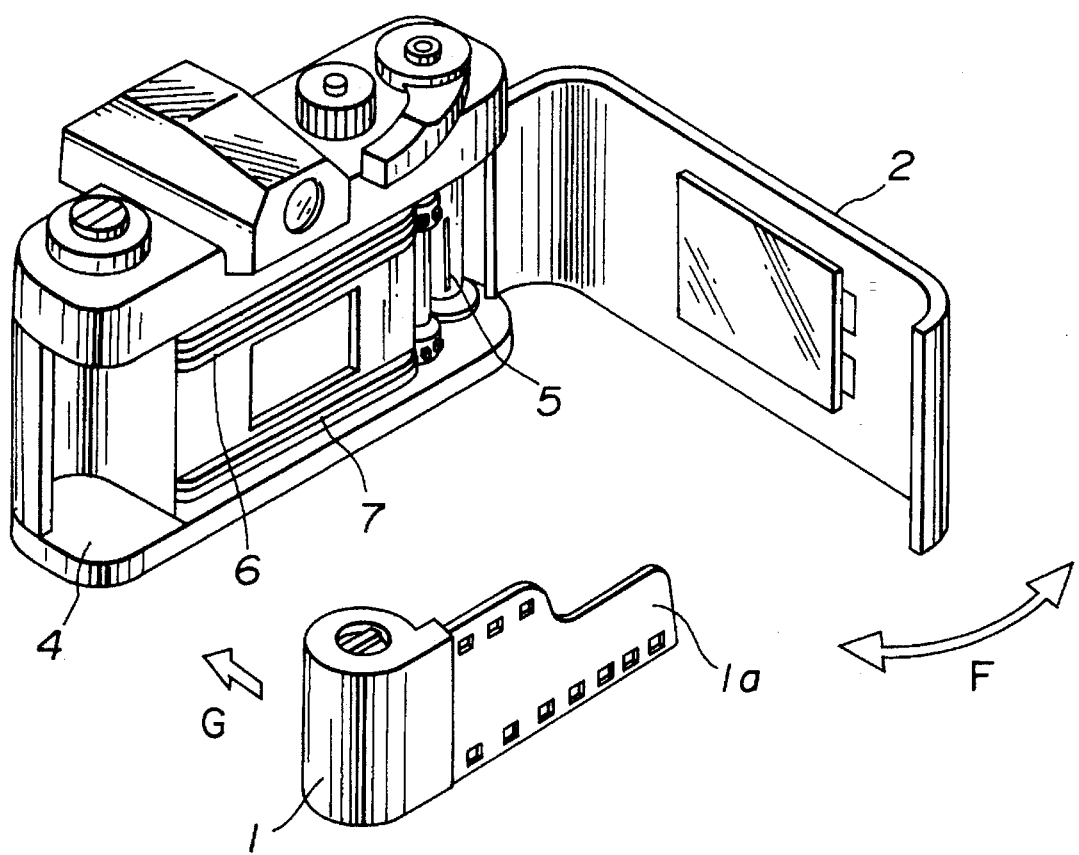
FIG. 11 is a perspective view of a conventional camera with an opened back door.

A single-reflex camera of a fourth embodiment of the present invention will be described with reference to FIG. 10 shown in perspective.

In the above-described second embodiment, the electrical circuit board 34 is accommodated in the back door 14 which can be opened and closed, with the FPC36, serving as a connecting means between the board 34 and the electrical circuit board 45 at the camera body side, placed near the hinged portion for rotating the back door 14. The camera of the present embodiment has no lock mechanism used in the camera of the first embodiment, that is, it has no retaining means for preventing operational errors which retains the back door 14 so that it will not open, while the film cartridge is loaded, nor does it have an indicating section which indicates that the film cartridge is loaded. Accordingly, the camera of the present embodiment, in addition to the component parts of the camera of the second embodiment, further incorporates an indicating section which indicates that the above-described cartridge is loaded, and a lock mechanism for preventing operational errors.

FIG. 10 is a perspective view of the back door 14 of the camera of the present invention in an opened state. As illustrated in the Figure, in the present embodiment, an electrical circuit board 34 for data copying is incorporated in the back door 14 which serves as cover means capable of covering the area around the aperture of the opening 16a. The electrical circuit board 34 is connected to control electrical circuits incorporated in the camera body along the hinged portion serving as means for rotating the back door 14 by means of the connecting means, FPC 36, provided near the hinged portion. Such a connecting structure and structure for rotating the back door are the same as those for the camera of the second embodiment. Accordingly, these structures will not be described below.

In the camera of the present embodiment, as shown in FIG. 10, the film cartridge 11 (see FIGS. 1 and 5) is loaded in the same way as it is in the first and second embodiments. When the cartridge 11 is loaded in the cartridge chamber 13, an indicating window 19 serving as indicating means indicates in red via a lock lever 41.

When the film cartridge 11 is loaded, the lock mechanism serving as retaining means for preventing operational errors functions so that the back door 14 is not opened as a result of operational errors. The lock mechanism has the same structure as the lock mechanism of the camera of the first embodiment of the invention. When loading the film cartridge 11, the front end of the lock lever 41, rotatably placed near the cartridge chamber 13, is inserted into the retaining hole 14f at the back door 14. Therefore, the back door 14 does not open, when the cartridge is loaded.

The above-described indicating section and the lock mechanism both have the same structure as those for the camera of the first embodiment. Therefore, these structures will not be described below.

As described above, the camera of the present invention, which has features similar to those of the cameras of the first and second embodiments, is very handy and may be reduced in size.

What is claimed is:

1. A camera capable of being loaded with a film cartridge, in which a film piece, being wound around a spool shaft, is supplied by rotating said spool shaft in the film cartridge, said camera comprising:

first cover means which is opened for loading said film cartridge;

second cover means which is opened for exposing at least a portion of a film supplying path in a body of said camera;

movable indicating means indicating whether or not a film cartridge is loaded in the body of said camera; and moving means for moving said indicating means to a position which can be viewed from outside of the body of said camera when said film patrons is loaded, and which moves said indicating means to a position at which it cannot be viewed from outside of the body of said camera when said film patrone is removed from the camera.

2. A camera according to claim 1, wherein said moving means is located at a lower portion of the body of said camera and selectively rotates said indicating means to said positions which can be seen and cannot be seen from outside of the body of said camera and prevents said second cover means from being opened by interlocking means when the indicating means is rotated to a position in which said indicating means can be viewed from outside the camera.

3. A camera capable of being loaded with a film cartridge, in which a film piece, being wound around a spool shaft, is supplied by rotating said spool shaft in the film cartridge, said camera comprising:

a camera body;

first cover means on said body which is opened for loading said film cartridge;

second normally closed cover means on said camera body which is opened for exposing at least a portion of a film supplying path in said camera body; and retaining means for preventing said second cover means from being opened only when said film cartridge is loaded in said camera body.

4. A camera according to claim 3, wherein said retaining means comprises rotating means provided at a lower portion of the body of said camera.

5. A camera according to claim 3 wherein said second cover means is provided with separate locking means for releasably locking said second cover means to said camera body and wherein said retaining means prevents said second cover means from opening even when said separate locking means is in an unlocked position.

6. A camera capable of being loaded with a film cartridge, in which a film piece, being wound around a spool shaft, is supplied by rotating said spool shaft in the film cartridge, said camera comprising:

a camera body;

electrical circuits incorporated in said camera body;

first cover means on said camera body which is provided only for loading or removing a film cartridge;

second cover means on said camera body which, when open, can expose a portion of an interior of said camera body adjacent to a film supplying path only for repair or inspection of the camera, said second cover means being normally maintained in a closed position, said second cover means, which internally incorporates electrical circuits, being rotatable about a shaft arranged substantially parallel to a film feeding path, said shaft being located at a lower portion of said camera body; and a flexible print board which connects electrical circuits of said camera body and electrical circuits in said second cover means at said lower portion of said camera body.

7. A camera according to claim 6, wherein said second cover means includes means for rapidly removing said second cover means from said camera body.

8. A camera according to claim 1 wherein said camera body is provided with a viewing window to enable said indicating means to be viewed from outside of the body of the camera only when a film patrone is loaded in the camera.

9. A camera capable of being loaded with a film cartridge, in which a film piece, being wound around a spool shaft, is supplied by rotating the spool shaft in the film cartridge, said camera comprising:

a camera body;

a cartridge chamber in said camera body into which is loaded said film cartridge;

first cover means on said camera body for closing said cartridge chamber;

second cover means on said camera body which is opened to expose a portion of a camera interior only for repair or inspection of the camera, said second cover means being provided to cover a back side of said camera body;

movable indicating means for indicating that said film cartridge is loaded in the cartridge chamber, responsive to a cartridge being loaded therein; and opening prevention means for preventing said second cover means from being opened responsive to said film cartridge being loaded in a cartridge chamber.

10. A camera capable of being loaded with a film cartridge, in which a film piece, being wound around a spool shaft, is supplied by rotating the spool shaft in the film cartridge, said camera comprising:

a camera body;

a cartridge chamber on said body for receiving a film cartridge;

first cover means on said body for covering said cartridge chamber when in a closed position;

second cover means on said body which exposes at least a portion of a camera interior when opened, said second cover means being provided to cover a back side of said camera body; and retaining means which prevents said second cover means from being opened by interlocking means responsive to a film cartridge being loaded in said cartridge chamber and independent of a locked state or unlocked state of separate locking means provided for said second cover means.

11. A camera in which a film cartridge is inserted by being dropped therein, so that a film is loaded, said camera comprising:

an opening which exposes at least an aperture and film rails provided above and below said aperture, said rails being substantially parallel to a direction of film feeding;

a shaft arranged substantially parallel to the film rails and located adjacent to a lower portion of a film rail surface and at a lower side of said camera body;

cover means rotatably mounted on said shaft and including electrical circuits arranged between a pressure plate for pressing a film toward said aperture, said cover means being swingable between positions shielding and exposing said opening;

a flexible board arranged near said shaft for connecting electric circuit means provided in said cover means and electric circuit means in said camera body; and retaining means for moving interlocking means to a position in which said cover means is maintained locked by said interlocking means responsive to loading of said film cartridge, said retaining means moving said interlocking means to a position in which said cover means is free to be opened responsive to removal of said film cartridge from the camera.

12. A camera according to claim 11, wherein said electrical circuit means comprises a data processing circuit for copying information on the film.

13. A camera according to claim 11, wherein said retaining means is in said camera body, and has lever means which rotates to a position retaining said cover means by interlocking means when said film cartridge is loaded, said cover means having a retaining hole for receiving said interlocking means.

14. A camera, in which a film cartridge is inserted by being dropped therein, so that the film is loaded, said camera comprising:

an opening which exposes at least an aperture and elongated film rails provided above and below the aperture and arranged substantially parallel to a direction of feeding of said film;

electrical contact means at a camera body side provided below the film rails at a lower portion of the camera body and substantially parallel to said film rails;

cover means removably provided to selectively cover uncover the opening in the body of said camera, said cover means being normally rotated to a position to selectively shield or expose said opening;

rotating means formed of shaft supporting members provided along one side of said cover means and at a lower side of said camera body and receiving and supporting a shaft for swingably supporting the cover means upon said shaft, said shaft being arranged substantially parallel to said film rails to provide for enabling positioning of additional electrical contact means therealong;

electrical circuit means provided for said cover means; and cover side contact means provided in said cover means, which contact means connects with said electrical circuit means to electrically couple said electrical circuit means and the electrical circuits at the camera body side, when said cover means is in said shielding position.

15. A camera according to claim 14 wherein said electrical circuit means on the cover means comprises at least one of a data processing circuit for copying information onto the film, an automatic focusing circuit, a motor control circuit, a microcomputer, and a memory circuit.

16. A camera in which a film cartridge is inserted by being dropped therein, so that the film is loaded, said camera comprising:

an opening which exposes at least an aperture and film rail surfaces provided above and below the aperture and arranged substantially parallel to a direction of loading of said film;

electrical contact means at a camera body side provided below the film rail surfaces at a lower portion of the camera body and nearly parallel to said film rails:

cover means removably provided with respect to the opening of the body of said camera, said cover means usually being rotated to a position shielding said opening;

a shaft provided adjacent to a lower portion of said electrical contact means in said camera body;

rotating means formed of rotation supporting members provided at one of said cover means at a lower side of said camera body and at the lower side of said camera body and rotatably supported by said shaft:

electrical circuit means provided for said cover means;

cover side contact means provided in a position connecting with said electrical contact means of said camera body when said cover means is disposed in a position shielding said opening; and retaining means retaining said cover means locked only when a film cartridge is loaded in the camera, said retaining means unlocking said cover means when said film cartridge is removed from the camera, 17. A camera according to claims 16 wherein said retaining means has lever means rotatable with respect to said camera body, and a retaining opening being provided in said cover means for receiving a portion of said lever means.

18. A camera in which a film cartridge is inserted into a cartridge chamber of a camera body by dropping it thereinto, so that a film in said cartridge is loaded, said camera comprising:

an opening provided near said aperture at a back side of the camera body;

cover means which selectively covers and exposes said opening; and retaining means which locks said cover means in the covered state only when a film cartridge is loaded in said cartridge chamber.

19. A camera according to claim 18, wherein said retaining means comprises loading detecting means for detecting when a film cartridge is loaded in the camera body; and a locking member which retains said cover means responsive to the detection of said loading detecting means so that said cover means cannot open when a film cartridge is loaded in said camera body.

20. A camera according to claim 18, wherein said cover means is removably mounted on said camera body to cover said opening so that an inner part of a camera can be exposed only for repair or inspection of the camera, whereby separate cover means is provided for loading or unloading a film cartridge.

21. A camera according to claim 18, wherein said cover means is rotatably mounted by rotation support means provided at a lower portion of said aperture on a lower side of said camera body and having an axis of rotation substantially parallel to a film feeding direction, said cover means being movable with regard to said camera body only for repair or inspection of the camera, separate cover means being provided for loading and unloading a film cartridge.

22. A camera according to claim 21, wherein said rotation support means includes a rotation support mounted on one of said cover means and the body of said camera, and a support pin, slidable in an axial direction with regard to said rotation support to facilitate rapid removal and replacement of said cover means on said camera.

23. A camera according to claim 22 wherein said rotation supporting means on the camera body slidably receives one end of said pin and an opening in said cover means slidably receives another end of said pin;

an elongated slot provided in said cover means communicating with the opening in said cover means slidably receiving said pin;

an operating member integrally joined to said pin and extending through said elongated slot whereby movement of said operating member in a first direction inserts said one end of said pin to said rotation supporting means on said camera body and movement in the opposite direction withdraws said one of said pin from the rotation supporting means on said camera body.

24. A camera in which a film cartridge is inserted into a cartridge chamber of a camera body by dropping it thereinto, so that a film in said cartridge is loaded, said camera comprising:

an opening provided near said aperture at a back side of the camera body;

cover means which selectively covers and exposes said opening;

retaining means which locks said cover means in the covered state only when a film cartridge is loaded in said cartridge chamber;

said retaining means having lever means rotatable with respect to said camera body, which retaining means is operative responsive to a film cartridge being loaded in or removed from the camera to respectively move the lever means to lock or release said cover means; and a retaining opening for receiving said lever means being provided in said cover means.

25. A camera capable of being loaded with a film cartridge, in which a film piece, being wound around a spool shaft, is supplied by rotating said spool shaft in the film cartridge, said camera comprising:

first cover means movable to an open position for loading a film cartridge;

second cover means movable to an open position for exposing at least a portion of a film supplying path in a body of said camera;

first locking means for normally maintaining said second cover means in a closed state; and second locking means which prevents said second cover means from being opened by interlocking means responsive to a film cartridge loaded in a body of said camera.

26. A camera according to claim 25, wherein said second cover means is prevented from being opened due to said second locking means even when said first locking means is carelessly or accidently operated to a position unlocking said second cover means, so long as a film cartridge is loaded in the body of said camera.

27. A camera in which a film cartridge is inserted by being dropped therein, so that a film is loaded, said camera comprising:

a camera body having an opening which exposes at least an aperture and film rails provided above and below said aperture and arranged substantially parallel to a direction of film feeding;

a shaft arranged substantially parallel to said film rails and located adjacent to a lower portion of a film rail surface and at a lower side of said camera body;

cover means rotatably mounted on said shaft and including electrical circuits arranged between pressure plate means arranged on said cover means and said cover means for pressing a film toward said aperture, said cover means being swingable about said shaft between positions respectively shielding and exposing said opening;

a flexible board arranged near said shaft for connecting electric circuit means provided in said cover means to electric circuit means in said camera body, said flexible board including a combination of connecting pins and contact boards;

retaining means for moving interlocking means to a position in which said cover means is locked in the shielding position by said interlocking means responsive to loading of said film cartridge, said retaining means moving said interlocking means to a position to unlock said cover means responsive to removal of said film cartridge from the camera;

a data processing circuit for copying information onto a film being provided as part of said electric circuit means;

said cover means having a retaining opening; and said interlocking means including lever means being inserted into said retaining opening when said film cartridge is loaded in the camera.

28. A camera, in which a film cartridge is inserted by being dropped therein, so that the film is loaded, said camera comprising:

a camera body having an opening which exposes at least an aperture and elongated film rails provided above and below said aperture and arranged substantially parallel to a direction of feeding of said film;

electrical contact means at a camera body side provided below the film rails at a lower portion of the camera body and substantially parallel to said film rails;

swingably mounted cover means removably provided to selectively cover and uncover said opening, said cover means being normally rotated to a position shielding said opening;

rotation support means comprising shaft supporting members provided along one side of said cover means and at a lower side of said camera body and receiving and supporting a shaft for swingably supporting the cover means upon said camera body, said shaft being substantially parallel to said film rails to thereby provide for positioning of additional electrical contact means therealong;

electrical circuit means provided on said cover means;

cover side contact means provided in said cover means, which contact means connects with said electrical circuit means to electrically couple said electrical circuit means and electrical contact means of electrical circuits at the camera body side, when said cover means covers said opening;

means for rotatably mounting said cover means on said shaft;

said rotation support means being substantially parallel to and below the electric contact means arranged at the camera body side of the camera;

said shaft being slidable in an axial direction in said cover means and said rotation support means to facilitate rapid removal of said cover means from said camera body;

said electrical circuit containing means on the cover side means comprising at least one of a data processing circuit for copying information onto a film, an automatic focusing circuit, a motor control circuit, a microcomputer, and a memory circuit;

retaining means for locking said cover means in the covered position when a film cartridge is loaded in the camera and for unlocking said cover means when a film cartridge is removed from the camera;

said cover means having a retaining opening; and said retaining means including rotatable lever means movable into said retaining opening when a film cartridge is loaded in the camera and being released from said retaining hole when a film cartridge is removed from the camera.

29. A camera in which a film cartridge is inserted into a cartridge chamber of a camera body by dropping it thereinto, so that a film in said cartridge is loaded, said camera comprising:

a camera body having an opening provided near said aperture at a back side of the camera body;

cover means which selectively covers and exposes said opening;

retaining means which locks said cover means to said camera body when the cover means covers said opening so long as a film cartridge is loaded in said cartridge chamber;

said cover means having a retaining opening; and said retaining means including rotatable lever means movable into said retaining opening when a film cartridge is loaded into the camera and being removed from said retaining opening when a film cartridge is removed from the camera.

30. A camera in which a film cartridge is inserted into a cartridge chamber of a camera body by dropping it thereinto, so that a film in said cartridge is loaded, said camera comprising:

a camera body having an opening provided near said aperture at a back side of the camera body;

cover means which selectively covers and exposes said opening;

retaining means which locks said cover means to said camera body when the cover means covers said opening so long as a film cartridge is loaded in said cartridge chamber; and said retaining means including loading detecting means for detecting that a film cartridge is loaded in the camera body and a retaining member for retaining said cover means locked in the covered position responsive to detection that a film cartridge is loaded in the camera by said loading detecting means.

31. A camera in which a film cartridge is inserted by being dropped into the camera, so that the film is loaded, said camera comprising:

a camera body having a chamber for receiving a film cartridge;

a first opening in said camera body communicating with said chamber;

a second opening in said camera body which exposes at least an aperture and elongated film rails provided above and below said aperture and arranged substantially parallel to a direction of feeding of said film;

said second opening being arranged so that a film cartridge can neither be inserted into or removed from said chamber through said second opening;

first cover means being mounted to respectively cover and uncover said first opening;

second cover means being swingable to selectively cover and uncover said second opening;

said first and second cover means being normally rotated to a position to selectively respectively shield said first and second openings;

electrical circuit means provided on said second cover means;

means for coupling said electrical circuit means on said cover means with electrical circuits in said camera body;

means for rotatably supporting said second cover means upon said camera body; and retaining means for locking said second cover means in the covered position responsive to a film cartridge being loaded in the camera and for unlocking said second cover means responsive to a film cartridge being removed from the camera;

whereby provision of said first cover means reduces the frequency of use of said second cover means, which is principally utilized for inspection and repair purposes, to significantly reduce stress, wear and tear experienced by said electrical circuits and especially the coupling means therefor.

* * * * *